UNITED STATES PATENT OFFICE.

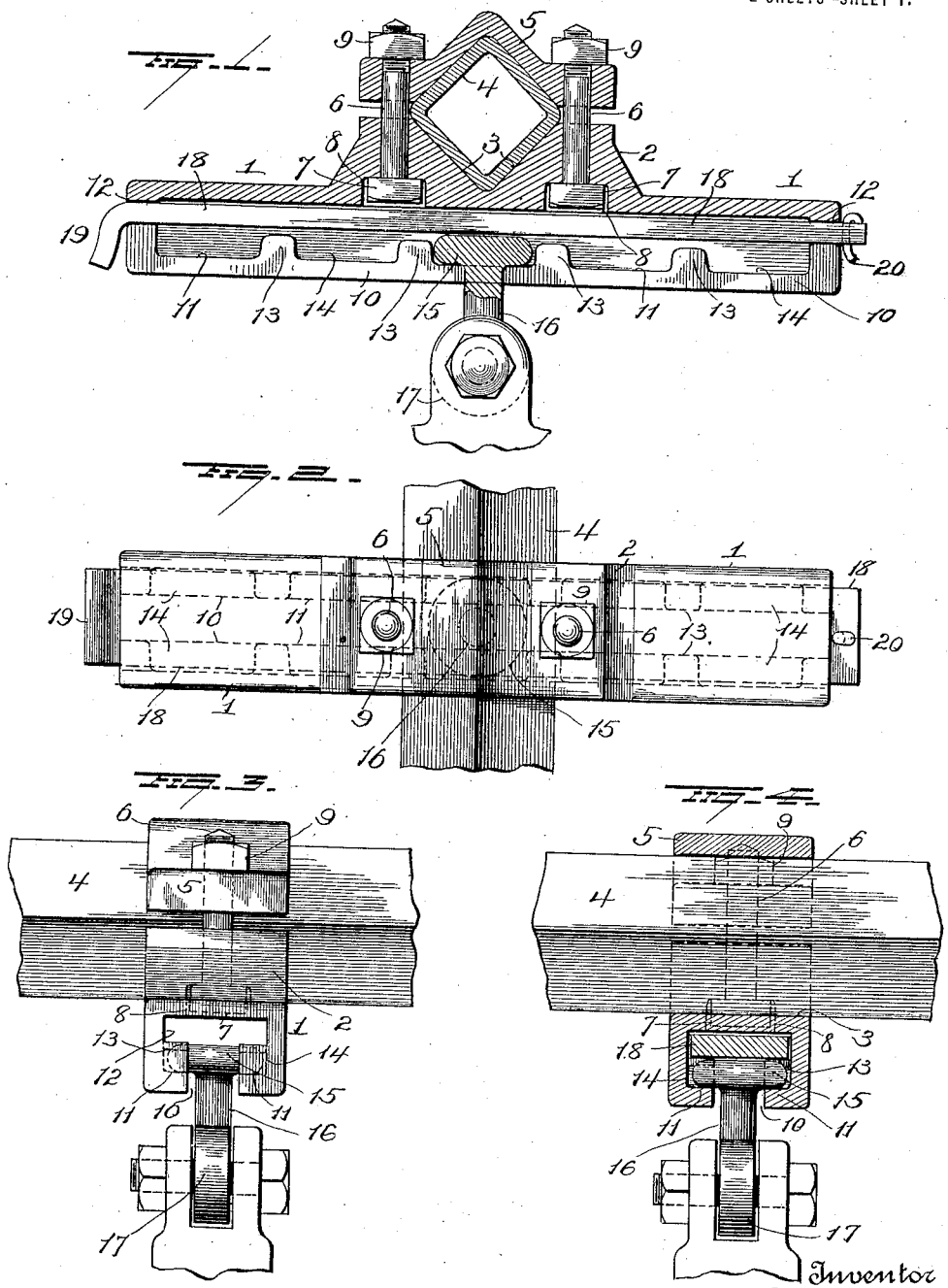

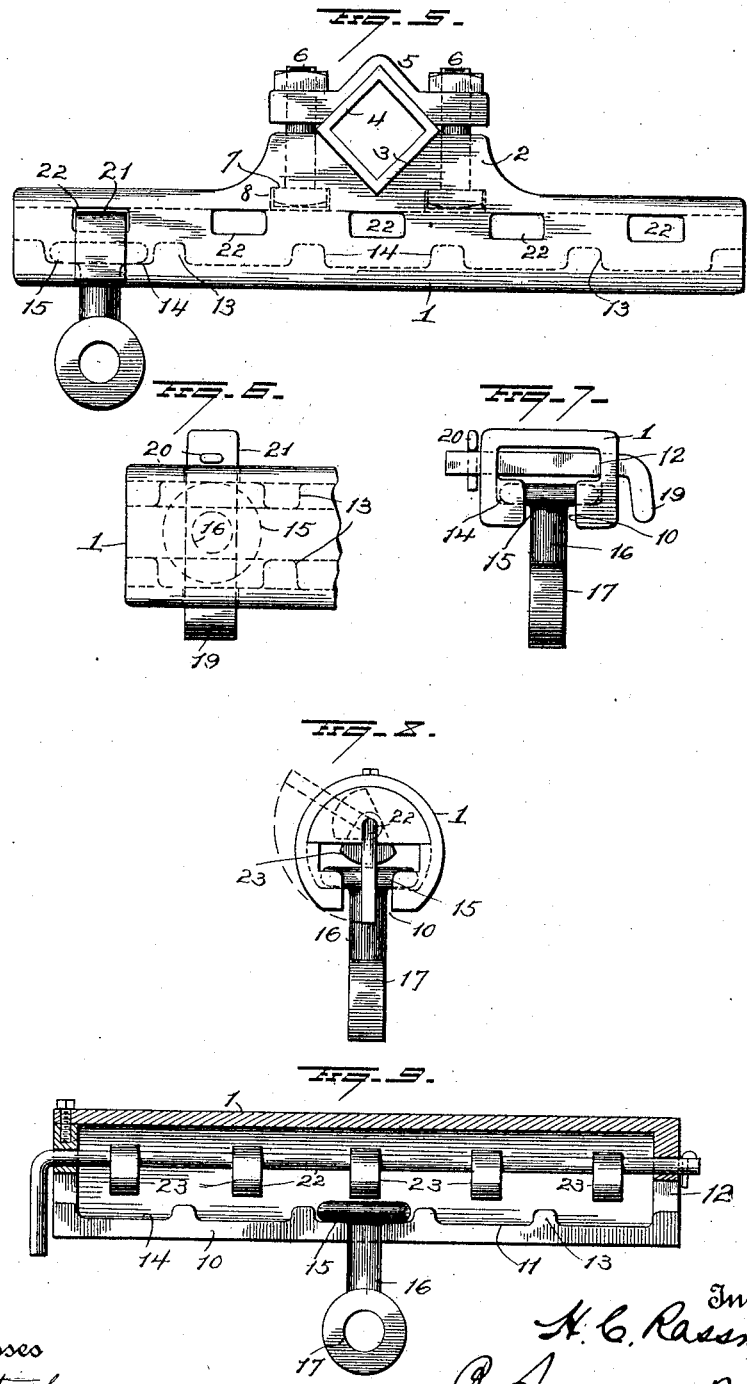

HUGO C. RASSMANN, OF BEAVER DAM, WISCONSIN, ASSIGNOR TO F. RASSMANN MANUFACTURING COMPANY, OF BEAVER DAM, WISCONSIN.

SUPPORTING AND ALINING MEANS FOR STANCHIONS.

1,327,735.   Specification of Letters Patent.   Patented Jan. 13, 1920.

Application filed April 23, 1919. Serial No. 292,059.

*To all whom it may concern:*

Be it known that I, HUGO C. RASSMANN, a citizen of the United States, and a resident of Beaver Dam, in the county of Dodge and State of Wisconsin, have invented certain new and useful Improvements in Supporting and Alining Means for Stanchions; and I do hereby declare the following to be a full, clear, and exact description of the invention, such as will enable others skilled in the art to which it appertains to make and use the same.

This invention relates to improvements in stall constructions and more particularly to supporting and alining means for stanchions for adjusting the latter to accommodate animals of different sizes,—one object of the invention being to provide simple and efficient devices whereby the swivel of a stanchion can be moved from one position to another to adjust the stanchion to accommodate a particular animal and whereby the swivel and therefore the stanchion shall be properly held against displacement at any desired adjustment.

With this and other objects in view, the invention consists in certain novel features of construction and combinations of parts as hereinafter set forth and pointed out in the claims.

In the accompanying drawings: Figure 1 is a sectional view showing an embodiment of my invention; Fig. 2 is a plan view; Fig. 3 is an end view; Fig. 4 is a view illustrating the swivel; Figs. 5, 6 and 7 are views illustrating a modified construction, and Figs. 8 and 9 are views showing another modification.

My improved stanchion adjusting or alining devices may be connected with either the top or the bottom portion of a stall structure, but in the drawing I have shown said devices connected with the top bar of a stall structure.

1 represents an elongated bracket or support provided with an enlargement 2 having a seat 3 for the under side of the top bar 4 of a stall structure. A clamping plate 5 is disposed over the stall bar 4 and is formed with a suitable seat for the latter,— said clamping plate being provided with holes near its ends for the accommodation of bolts 6. These bolts pass also through holes in the enlargement 2 of the bracket 1 and their heads 7 are disposed in countersunk portions 8 of said enlargement, the upper portions of said bolts being threaded for the reception of clamping nuts 9.

The bracket or support 1 is made hollow and its bottom portion is made with an elongated slot 10 whereby ledges 11 are formed, while the respective ends of said bracket or support are made, above the slotted lower portion, with openings 12, for purposes hereinafter explained. The ledges 11 formed by the slotting of the bottom portion of the bracket, are provided with transverse ribs 13, whereby several sockets or recesses 14 are formed to receive the head 15 of a swivel 16, the shank portion of which passes through the slot 10, and the lower end of said swivel is formed with an eye 17 to permit attachment to the upper end of a stanchion as will be readily understood.

The swivel 16 which forms the connecting means for the stanchion to the bracket may be inserted into the latter from either end thereof,—the head entering said bracket through one of the end openings 12,—and said swivel-head may be disposed in any one of the sockets or recesses 14 to support the stanchion at any desired adjustment according to the size of the animal which is to occupy the stall.

The swivel 16 and therefore the stanchion with which it is connected, will be held from displacement from the position in which the same may be adjusted, by means of a locking device. In the embodiment of my invention shown in Figs. 1, 2 and 3 the locking device consists of a flat bar 18 which is passed through the openings 12 of the bracket and is disposed over the head of the swivel so as to prevent the same from rising out of the socket in which it may be adjusted. The locking bar projects at its ends beyond the ends of the bracket or support 1 and may be provided at one end with a hand-hold 19, a key 20 being passed through the other end portion of said bar to prevent displacement of the latter. To adjust the swivel from one position to another, it is simply necessary to withdraw the locking bar sufficiently to remove it from over the head of the swivel, when the latter can be raised from one socket 14 and dropped into another socket, after which the operator will replace the locking bar. The swivel can be removed from the bracket at the end of the latter.

Instead of employing a locking bar extending longitudinally through the bracket or support 1, a short locking bar 21 may be used as shown in 5, 6 and 7 and the side walls of the bracket provided with openings 22 to permit said short locking bar to be passed transversely through the bracket over any of the swivel sockets 14 therein.

In the form of the invention shown in Figs. 8 and 9, the locking device is made in the form of a bar 22 rotatively mounted in the bracket 1 and provided with arms or enlargements 23 disposed over the several sockets 14 so as to prevent displacement of the swivel. By turning the bar 22, the arms or enlargements 23 will be moved laterally so as to permit the head of the swivel to be raised out of one socket 14 and dropped into another socket.

Other changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In supporting means for stanchions, the combination with an elongated hollow bracket having a plurality of sockets therein and having an elongated slot, and a connecting device for a stanchion entering said bracket and having a head to be mounted in any one of said sockets, of a movable locking device disposed in said bracket and adapted to be disposed over the head of said connecting device to prevent displacement of the latter from the socket in which it may be disposed.

2. In a device of the character described, the combination with a hollow bracket having therein a plurality of sockets for the reception of the swivel of a stanchion, and having a slot for the accommodation of the shank of said swivel, of a locking device mounted in said hollow bracket so as to be disposed over the sockets therein for preventing displacement of a swivel from any one of said sockets, said locking device being movable to permit adjustment of the swivel from one socket to another.

3. In supporting means for stanchions, the combination with an elongated hollow bracket having a slot for the accommodation of a connecting device for a stanchion, said bracket having therein a plurality of sockets for the reception of the head of such connecting device, of a movable bar passing through said bracket in position to be disposed over the head of the connecting device to prevent displacement of the latter from the socket in which it may be disposed.

4. In supporting means for stanchions, the combination with an elongated hollow bracket having a slot in its bottom and having a plurality of internal sockets, and a connecting device for a stanchion, said connecting device having a head to be disposed in any one of said sockets, of a locking bar passing through said bracket and removable therefrom, said bar being disposed over the head of the connecting device and in such proximity thereto as to prevent the same from escaping from the socket in which it may be located.

5. In supporting means for a stanchion, the combination with an elongated hollow bracket having a plurality of sockets therein, and also having a longitudinal slot in its bottom and openings in its ends, and a connecting device movable in said slot and having a head movable through the opening at one end of the bracket and adapted to seat in any one of said sockets, of a removable locking bar passing through said bracket and through the openings at the ends thereof, said locking bar being disposed over said sockets and in such proximity thereto as to prevent displacement of the head of the connecting device from the socket in which it may be located.

6. In supporting means for stanchions, the combination of an elongated hollow bracket having an elongated slot in its bottom forming ledges, ribs on said ledges forming a plurality of sockets in said bracket, a connecting device movable through said slot and having a head to seat in any one of said sockets, and a removable locking bar passing through said bracket and over the head of the connecting device in such proximity thereto as to prevent displacement of said head from the socket in which it may be disposed.

7. In supporting means for stanchions, the combination of an elongated hollow bracket having a slot in its bottom and having a plurality of internal sockets, a connecting device movable through said slot and having a head to seat in any one of said sockets, and a removable locking bar passing through said bracket in position to be disposed over the head of the connecting device and prevent its displacement from the socket in which it may be located, a hand hold at one end of said locking bar, and means near the end of said locking bar to prevent accidental displacement of the latter.

8. In supporting means for stanchions, the combination with a bar of a stall, of an elongated hollow bracket, a clamp securing said bracket to the stall bar, said hollow bracket having a plurality of internal sockets and having an elongated slot in its bottom wall, a swivel movable through said slot and having a head to seat in any one of said internal sockets, and a removable locking bar passing through said hollow bracket in position to prevent displacement of the head of the swivel from the socket in which it may be seated.

9. In supporting means for stanchions, the combination with a bracket having a plurality of sockets for the reception of the swivel of a stanchion and having a slot for the accommodation of the shank of said swivel, of a locking device mounted in said bracket and adapted to be disposed over the head of a swivel mounted in one of said sockets, and means for holding said locking device against displacement.

10. In supporting means for stanchions, the combination of an elongated slotted hollow bracket having a plurality of internal sockets, a connecting device movable through the slot of the bracket and having a head to seat in any one of said sockets, a locking bar passing through the bracket in position to be disposed over the head of the connecting device and prevent its displacement from the socket in which it may be located, and means near one end of said locking bar to prevent displacement of the latter.

In testimony whereof, I have signed this specification in the presence of two subscribing witnesses.

HUGO C. RASSMANN.

Witnesses:
ARTHUR BEDKER,
J. McCLURE.